Patented Feb. 17, 1942

2,273,469

UNITED STATES PATENT OFFICE 2,273,469

DRIED MILK PRODUCT

James D. Ingle, Chicago, Ill., assignor to Industrial Patents Corporation, Chicago, Ill., a corporation of Delaware No Drawing. Application March 16, 1939,
Serial No. 262,286

5 Claims. (Cl. 99—56)

This invention relates to an improved dried modified skimmed milk.

One of the objects of this invention is to provide an improved dried modified skimmed milk product.

Another object of this invention is to provide a dried modified skimmed milk product which is particularly useful in the production of bakery products.

Other objects of this invention will become apparent from the description and claims which follow.

In recent years attempts have been made to produce dried skimmed milk powders for use in ice cream, meat products, and bakery goods. Although dried skimmed milk powder has been used in bread-making and constitutes a convenient method of adding milk solids to bread, different samples of dried skimmed milk produce different results in the baked bread. Some of the powdered products have no effects on bread dough, while others retard fermentation or reduce the loaf volume of the baked product. No satisfactory method has been developed to overcome this disadvantage, and no method of testing dried skimmed milk products with respect to the properties toward bakery products is available.

Two processes most generally used in drying skimmed milk are spray drying and drum drying. Spray drying produces a product which is highly soluble, finely divided, and reasonably free from burnt or other flavors. Products dried on a heated drum under atmospheric pressure are dried at much higher temperatures than spray dried products and, as a result, the product tends to be much less soluble in water. All dried milk products tend toward flavor defects which are inherently imparted by the drying process, rendering the dried product less desirable for use in the manufacture of bakery goods and the like than condensed milk.

The present invention contemplates modifying skimmed milk prior to drying by the addition of a small proportion of starch.

In the practice of my invention, starch is first completely swelled in hot water and added to skimmed milk, preferably heated skimmed milk, for example, at a temperature of about 150 degrees F. The starch is thoroughly mixed with the milk, and the starch modified skimmed milk is then dried in any desired manner to form a dried starch modified skimmed milk product.

I have discovered that starch in an amount equivalent to from 0.05 per cent to 5.0 per cent of the skimmed milk solids produces a satisfactory final product. Examples of starch which are satisfactory for the purposes of my invention are corn starch, potato starch, sago starch, starch prepared from tapioca flour, starch prepared from psyllium seed, and modified corn starches, for example, the commercial product marketed under the trade name "Amigel." I have found that in general, 0.5 per cent starch, based on the skimmed milk solids, produces a very satisfactory product.

For a better understanding of the use of the dried starch modified skimmed milk product of my invention, two formulas are set forth illustrating the proportion of ingredients in representative yeast raised doughs. Formula A represents a general bread formula in which skimmed milk powder may or may not be used. Formula B represents a typical bread formula in which skimmed milk powder is used and is a formula which was employed in testing dried skimmed milk and my dried starch modified skimmed milk.

|  | Formula A | Formula B |
|---|---|---|
|  | Pounds | Pounds |
| Flour | 100 | 100 |
| Yeast | 1¼– 3½ | 2 |
| Salt | 1¾– 2½ | 2 |
| Shortening | 2 – 6 | 4 |
| Skimmed milk powder | 0 –12 | 6 |
| Water | 58 –70 | 68 |
| Sugar | 2 – 8 | 6 |
| Mineral yeast food | 0 – .5 | 0.25 |
| Malt | 0 – 2 | 0 |

Dried skimmed milk powders prepared from skimmed milk of different sources produce baked goods, such as bread, having widely varying texture and volume. Dried powders prepared from milk of the same source but dried at different times also produces bread having a varying texture and volume. These powders affect the fermentation of the dough. I have found that dried starch modified skimmed milk prepared according to my invention has exceptional and unexpected properties with respect to bakery goods in that it does not affect the fermentation of the dough. This dried starch modified skimmed milk produces bread having a better texture and volume than bread prepared from dried skimmed milk. The texture and volume of bread samples prepared with dried starch modified skimmed milk was found to be uniform regardless of the source of milk.

I claim:

1. The method of preparing dried skimmed milk products for use in bakery products which comprises incorporating with liquid skimmed milk about 0.05 per cent to 5 per cent starch based on the solids content of the milk and drying the resulting mixture whereby a dried milk product adapted to produce a bakery product of improved texture, uniformity and volume is obtained.

2. The method of preparing dried skimmed milk products for use in bakery products which comprises forming a mixture of liquid skimmed milk and about 0.5 per cent starch based on the solids content of the milk and thereafter drying the mixture whereby a dried milk product adapted to produce a bakery product of improved texture, uniformity and volume is obtained.

3. A food product comprising a modified dried milk consisting essentially of about 99.95 per cent to 95 per cent dried skimmed milk and about 0.05 per cent to 5 per cent starch, said modified dried milk being adapted to produce bakery products of improved texture, uniformity and volume.

4. A food product comprising a dried mixture of skimmed milk and about 0.05 per cent to 5 per cent starch based on the solids content of the milk, said mixture being adapted to produce bakery products of improved texture, uniformity and volume.

5. A dried milk product adapted to produce bakery products of improved texture, uniformity and volume comprising about 99.5 per cent skimmed milk solids dried in the presence of about 0.5 per cent starch.

JAMES D. INGLE.